United States Patent
Huang et al.

(10) Patent No.: US 7,543,644 B2
(45) Date of Patent: *Jun. 9, 2009

(54) CONCENTRATED SUSPENSION OF PARTICULATE ADDITIVES FOR FRACTURING AND OTHER FLUIDS

(75) Inventors: Tianping Huang, Spring, TX (US); James B. Crews, Willis, TX (US); John R. Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/830,299

(22) Filed: Jul. 30, 2007

(65) Prior Publication Data

US 2008/0023201 A1    Jan. 31, 2008

Related U.S. Application Data

(60) Provisional application No. 60/834,513, filed on Jul. 31, 2006.

(51) Int. Cl.
*E21B 43/00* (2006.01)
*E21B 43/26* (2006.01)
*E21B 43/16* (2006.01)

(52) U.S. Cl. .............. 166/305.1; 166/279; 166/300; 166/308.2

(58) Field of Classification Search ............. None
See application file for complete search history.

(56) References Cited

U.S. PATENT DOCUMENTS

| | | | |
|---|---|---|---|
| 3,749,589 A * | 7/1973 | Sparlin et al. ............ 106/223 |
| 4,834,957 A | 5/1989 | Van de Walle | |
| 5,259,455 A | 11/1993 | Nimerick et al. | |
| 6,632,779 B1 * | 10/2003 | Vollmer et al. ............ 507/211 |
| 6,703,352 B2 | 3/2004 | Dahayanake et al. | |
| 6,908,886 B2 | 6/2005 | Jones et al. | |
| 7,196,039 B2 * | 3/2007 | Patel ............ 507/121 |
| 7,268,100 B2 * | 9/2007 | Kippie et al. ............ 507/131 |
| 2005/0176591 A1 * | 8/2005 | Jones et al. ............ 507/214 |
| 2005/0252658 A1 | 11/2005 | Willingham et al. | |
| 2006/0194700 A1 * | 8/2006 | Gatlin et al. ............ 507/140 |
| 2007/0151726 A1 * | 7/2007 | Crews et al. ............ 166/246 |
| 2007/0298978 A1 * | 12/2007 | Crews et al. ............ 507/265 |
| 2008/0035340 A1 * | 2/2008 | Welton et al. ............ 166/279 |
| 2008/0060812 A1 * | 3/2008 | Huang et al. ............ 166/308.2 |

\* cited by examiner

*Primary Examiner*—Zakiya W Bates
*Assistant Examiner*—Angela M DiTrani
(74) *Attorney, Agent, or Firm*—Madan, Mossman & Sriram, PC

(57) ABSTRACT

The handling, transport and delivery of particulate materials, particularly fine particles, may be difficult. Alkaline earth metal oxide particles such as magnesium oxide (MgO) may be suspended in glycerin and/or alkylene glycols such as propylene glycol up to loadings of 51 wt %. Such suspensions or slurries make it easier to deliver MgO and similar agents into fluids, such as aqueous fluids gelled with viscoelastic surfactants (VES). The MgO serves as stabilizers and/or fluid loss control agents for VES-gelled fluids used to treat subterranean formations, e.g. for well completion or stimulation in hydrocarbon recovery operations. The particle size of the magnesium oxide or other agent may be between 1 nanometer to 0.4 millimeter.

14 Claims, 4 Drawing Sheets

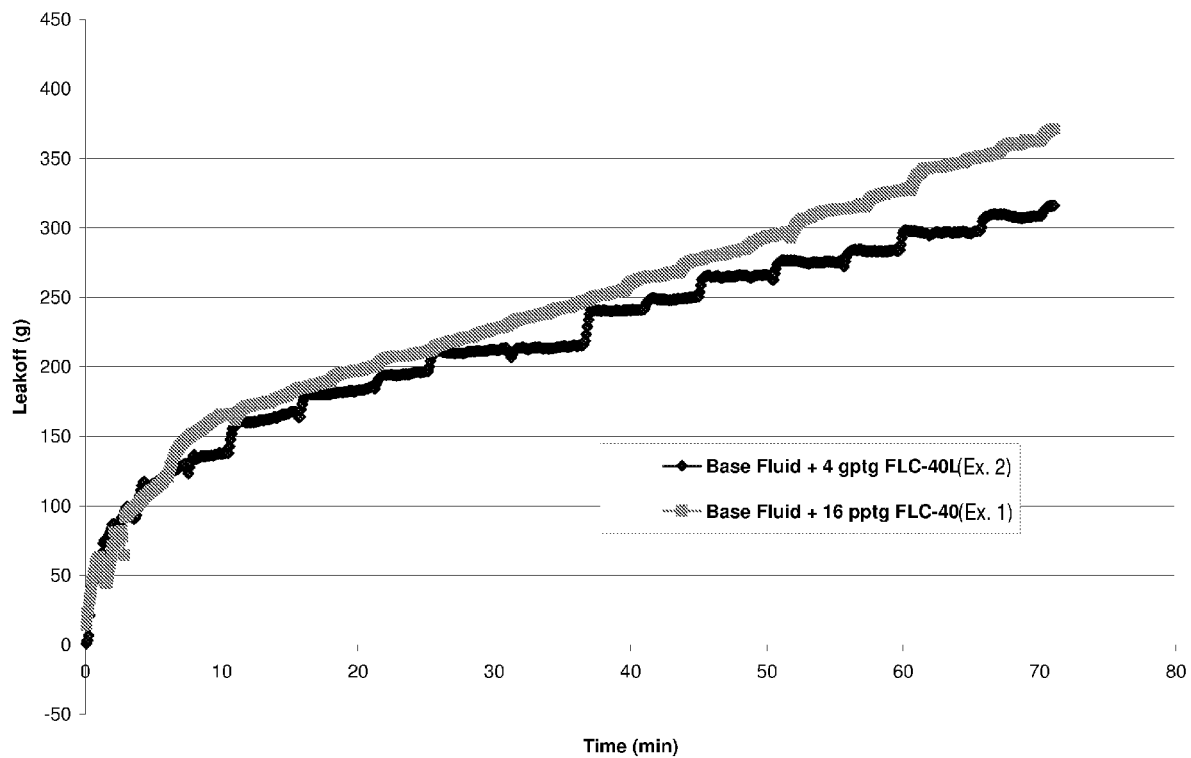

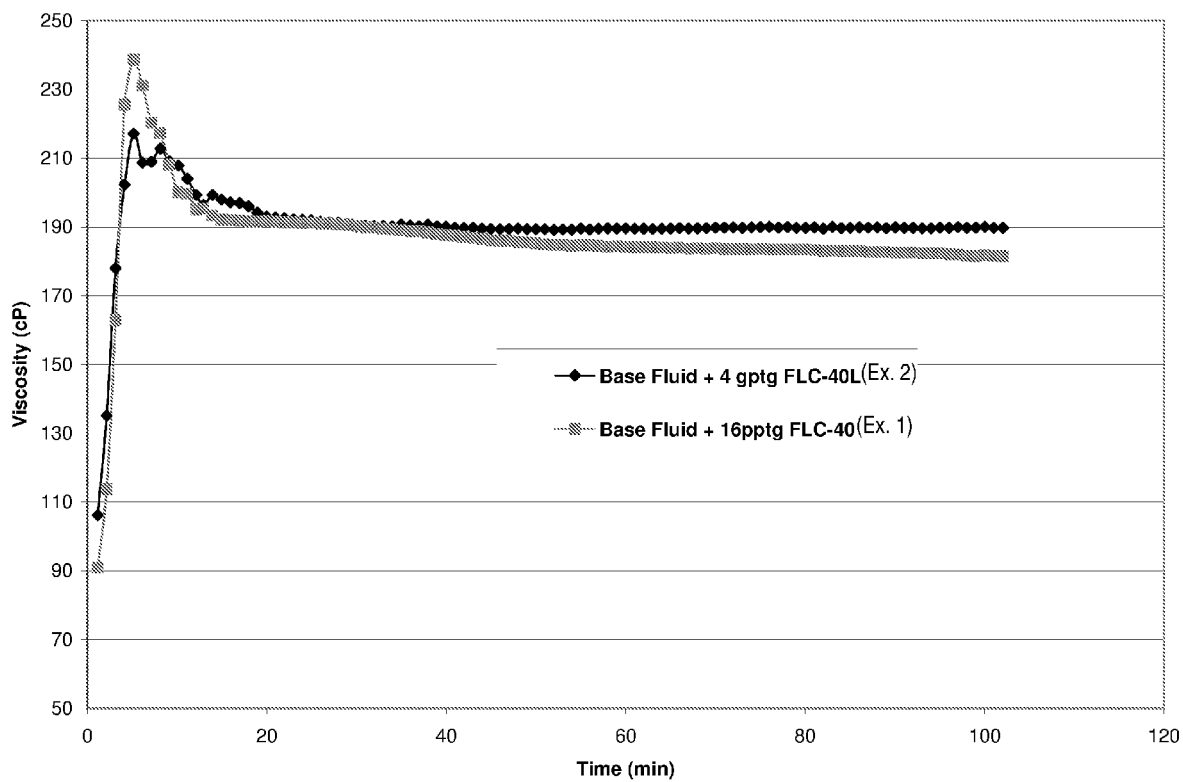

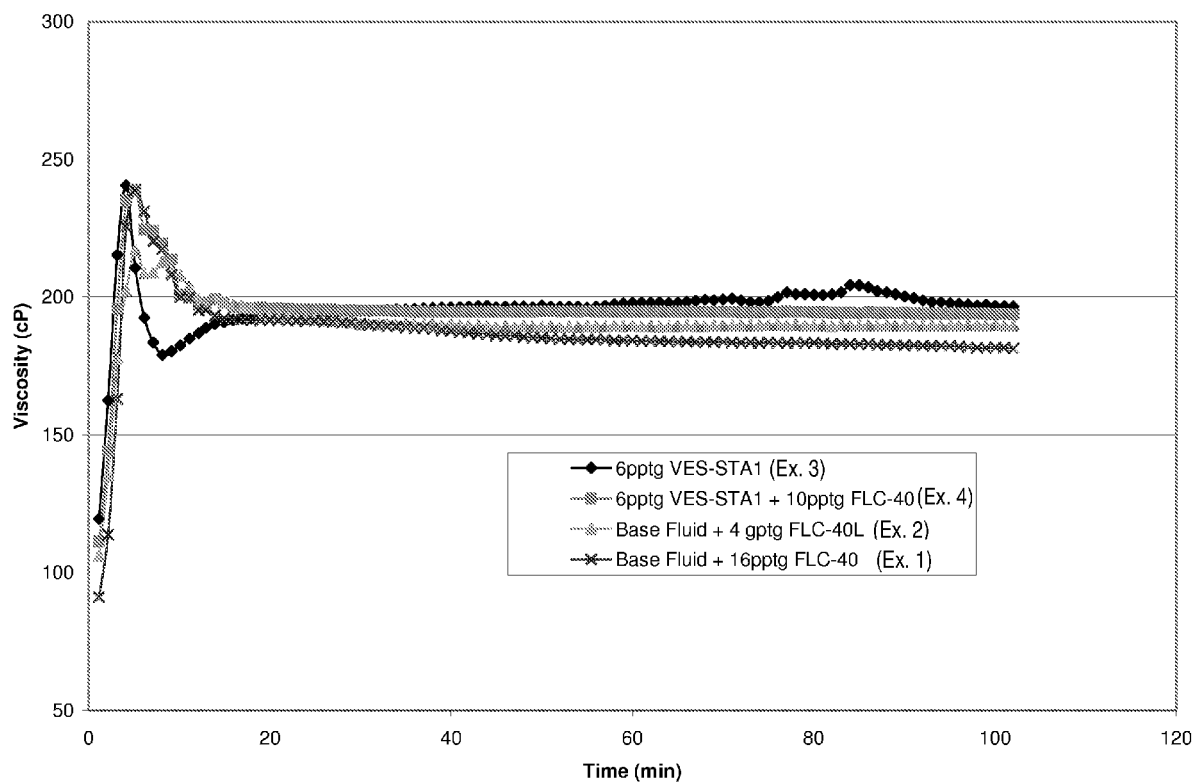
FIG. 3 - Viscosities of VES fluids at 250F (121C) and 100 1/s
Base Fluid: 13.0pptg (1.6 kg/L) CaCl2/CaBr2 + 4% WG-3L + 1gptg GBW-407L

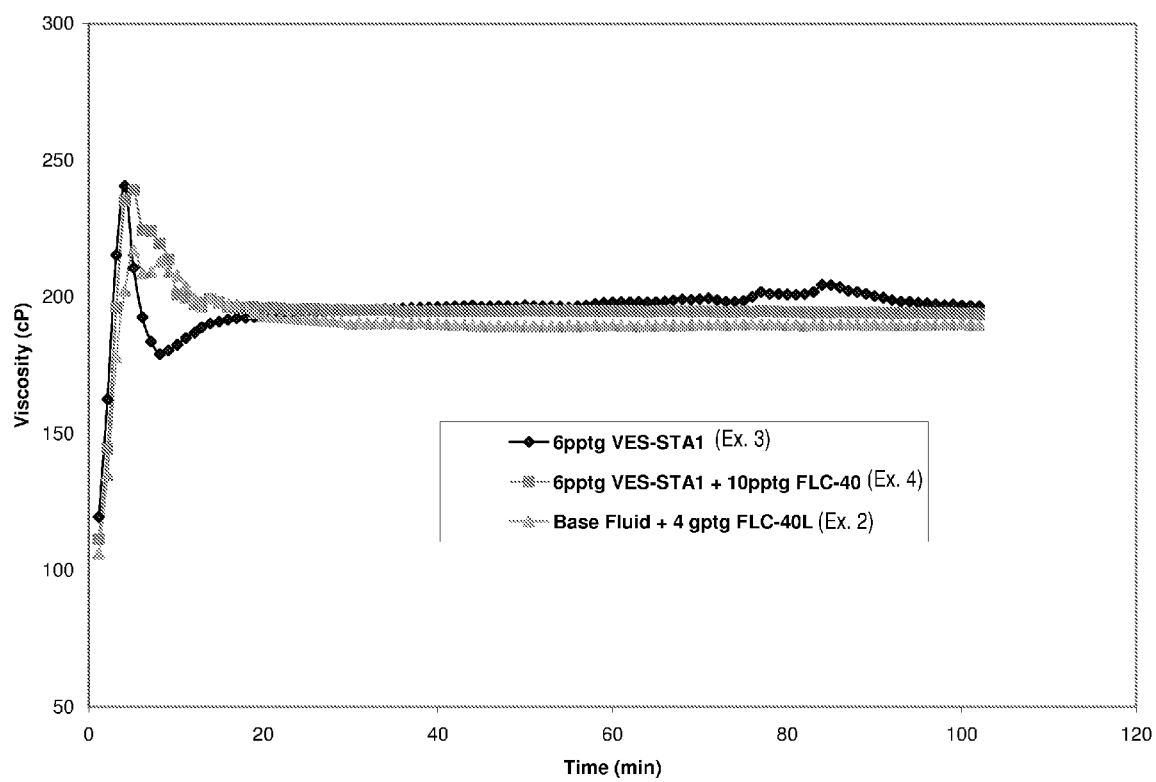

CONCENTRATED SUSPENSION OF PARTICULATE ADDITIVES FOR FRACTURING AND OTHER FLUIDS

CROSS-REFERENCE TO RELATED APPLICATION

This application claims the benefit of U.S. Provisional Patent Application 60/834,513 filed Jul. 31, 2006.

TECHNICAL FIELD

The present invention relates to suspensions and slurries of particles, and more particularly relates, in one embodiment, to methods and compositions for suspending fine particles in non-aqueous fluids to facilitate the handling of the particles.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations and the conductivity of propped fractures.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are also used as acid diverting, water and/or gas control fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to use fluid loss agents for VES fracturing treatments in high permeability formations.

Additives for aqueous drilling fluids, including fracturing fluids, which are fine particulates may be difficult to handle, transport and introduce into the fluids. The particulates may also cause dust problems. It would be desirable if a method and/or composition would be devised to make the handling, transportation and introduction of these particulate additives easier.

SUMMARY

There is provided, in one form, a concentrated slurry of particles that includes particles of having an average particle size of 400 microns in diameter or less. The particles may include, but are not necessarily limited to, alkaline earth metal oxides, alkaline earth metal hydroxides, transition metal oxides, transition metal hydroxides, and mixtures thereof. The particles are suspended or slurried in a non-aqueous fluid. Suitable non-aqueous fluids include, but are not necessarily limited to, alkylene glycols, glycerin and mixtures thereof.

There is further provided in another non-limiting embodiment a method for treating a subterranean formation that involves an aqueous viscoelastic treating fluid that includes an aqueous base fluid and a viscoelastic surfactant (VES) gelling agent which increases the viscosity of the aqueous base fluid. The method further involves adding to the aqueous viscoelastic treating fluid a fluid loss control agent slurry. The fluid loss control agent slurry includes a non-aqueous fluid that may include, but is not necessarily limited to, alkylene glycols, glycerin and mixtures thereof. The slurry also contains a fluid loss control agent that may be, but is not limited to being an alkaline earth metal oxide, alkaline earth metal hydroxide, transition metal oxide, transition metal hydroxide, and mixtures thereof. The slurry is injected into the aqueous viscoelastic surfactant treating fluid which is in turn introduced through a wellbore and into the subterranean formation for treating the subterranean formation.

Also provided in one non-restrictive form is an aqueous viscoelastic treating fluid that includes an aqueous base fluid and a VES gelling agent, along with a concentrated slurry of particles. The slurry includes particles of having an average particle size of 400 microns in diameter or less. As described above, the particles may include, but are not necessarily limited to, alkaline earth metal oxides, alkaline earth metal hydroxides, transition metal oxides, transition metal hydroxides, and mixtures thereof. The particles are suspended or slurried in a non-aqueous fluid including, but not necessarily limited to, alkylene glycols, glycerin and mixtures thereof.

The fluid loss control agents (e.g. MgO and/or $MgOH_2$, and the like) appear to help develop a pseudo-filter cake of VES micelles by associating with them as well as ions and particles to produce a novel and unusual viscous fluid layer of pseudo-crosslinked elongated micelles on the reservoir face that limits further VES fluid leak-off. Additionally, the art may be further advanced by use of nanometer-sized fluid loss control agents that also form a similar viscous fluid layer of pseudo-crosslinked micelles on the formation face that are equivalent to micron-sized fluid loss control agents herein for controlling rate of VES fluid loss, yet can be non-pore plugging and physically easier to produce back with the VES fluid after a VES treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

The addition of alkaline earth metal oxides, such as magnesium oxide, and alkaline earth metal hydroxides, such as calcium hydroxide, to an aqueous fluid gelled with a VES may increase the viscosity of the fluid, may help stabilize the fluid, and may prevent or inhibit the precipitation of solids in these brines. In particular, the VES-gelled aqueous fluids containing these agents may be more stable at high temperatures, such as at 200° F. (93° C.) or higher. This discovery allows the VES system to be used at a higher temperature, and helps minimize formation damage after hydraulic fracturing operations. The introduction of these additives to the VES systems could also possibly lower the amount of VES surfactant needed to obtain the fluid viscosity necessary to perform VES applications or treatments, particularly since less of the VES is lost due to fluid loss or precipitation.

BRIEF DESCRIPTION OF THE DRAWINGS

FIG. 1 is a graph of leakoff as a function of time for tests with 400 md ceramic discs at 250° F. (121° C.) and 300 psi (2.1 MPa) for different fluid loss control agents, where the base fluid was 13.0 ppg (1.6 kg/liter) $CaCl_2/CaBr_2$ brine, 4% VES, and 1 gptg breaker (SI units of gallons per thousand gallons have the same value for any convenient SI unit; e.g. liters per thousand liters or $m^3/1000\,m^3$, etc.) using 16 pounds per thousand gallons (pptg) (1.9 kg/$m^3$) of FLC-40 MgO introduced as powder compared with 4 gptg (4 liter/1000 liters) of FLC-40L MgO introduced as a powder slurry in propylene glycol (about the same amount of active MgO);

FIG. 2 is a graph of viscosity as a function of time for VES-gelled aqueous fluids at 250° F. (121° C.) and 100 $s^{-1}$ with a base fluid of 13.0 ppg (1.6 kg/liter) $CaCl_2/CaBr_2$ brine, 4% VES, and 1 gptg breaker for 16 pptg (1.9 kg/$m^3$) of FLC-40 compared with 4 gptg (0.5 gram/liter) of FLC-40L;

FIG. 3 is a graph of viscosity as a function of time for VES-gelled aqueous fluids at 250° F. (121° C.) and 100 $s^{-1}$ with a base fluid of 13.0 ppg (1.6 kg/liter) $CaCl_2/CaBr_2$ brine, 4% VES, and 1 gptg GBW-407L breaker for 16 pptg (0.5 g/liter) of FLC-40 compared with 4 gptg (4 liter/1000 liters) of FLC-40L, as well as 6 pptg (0.7 g/liter) VES STA-1 and 6 pptg (0.7 g/liter) VES STA-1 with 10 pptg (1.2 kg/$m^3$) FLC-40; and FIG. 4 is a graph of viscosity as a function of time for VES-gelled aqueous fluids at 250° F. (121° C.) and 100 $s^{-1}$ with a base fluid of 13.0 ppg (1.6 kg/liter) $CaCl_2/CaBr_2$ brine, 4% WG-3L VES, and 1 gptg GBW-407L breaker for 6 pptg (0.7 g/liter) VES STA-1 and 6 pptg (0.7 g/liter) VES STA-1 with 10 pptg (1.2 kg/$m^3$) FLC-40 compared to the same base fluid with 4 gptg (4 liter/1000 liters) of FLC-40L.

DETAILED DESCRIPTION

It has been discovered that alkaline earth metal oxides, alkaline earth metal hydroxides, transition metal oxides, transition metal hydroxides, and mixtures thereof, and in particular magnesium oxide may serve to inhibit or prevent fluid loss in aqueous fluids gelled with VESs, as described in U.S. Provisional Patent Application 60/815,693, incorporated herein in its entirety by reference. Some of these same materials may also be effective as system stabilizers and performance enhancers for aqueous fluids gelled with VESs, as described in U.S. Patent Application Publication 2005/0252658 A1, also incorporated herein in its entirety by reference. These magnesium oxide particles and powders and the like have been used as stabilizers for VES-gelled aqueous fluids at temperatures from about 180 to about 300° F. (about 82 to about 149° C.). The size of these MgO particles typically ranges from several nanometers to 400 microns in diameter.

However, these additives are available only in solid or particulate form, and it is sometimes difficult to handle, transport and introduce these particulates in field applications. In particular, the dry, solid particulates present a dust problem. Particles this small, which are on the order of powder size (colloidal sizes and smaller) are hard to handle in field applications. In most industrial applications, such as in hydrocarbon drilling and recovery operations, it is beneficial and customary to transport materials by pumps through pipes, tubulars and other conduits. Powders and particulates per se cannot be handled by this customary equipment. There is thus a need to provide these MgO particles in a liquid form. Magnesium oxide powder has a very high reactivity index and easily absorbs water; indeed MgO reacts facilely with water to form magnesium hydroxide ($Mg(OH)_2$). Consequently, water is not a suitable carrier for these materials.

It was discovered that the MgO particles could be provided in the form of a concentrated suspension slurry using propylene glycol as a carrier fluid for the particles. The concentrated suspension slurry is easy to pump to mix with other fluids such as VES-gelled aqueous fluids for hydraulic fracturing. As will be described, laboratory testing shows that magnesium oxide suspensions may comprise at least 37 weight % of magnesium oxide (the equivalent of about 5 pound per gallon loading (0.6 kg/liter), based on the combined weight of the propylene glycol and MgO. Viscosity testing and fluid loss tests at 250° F. (121° C.) show that the MgO slurry added into the VES-gelled aqueous fluid can maintain the fluid viscosity and fluid loss control properties, as compared with systems where the MgO is added as a dry, solid particulate or powder.

Fluid loss control agents of MgO particles have been developed by Baker Oil Tools for VES-gelled fluid systems and termed FLC-40 fluid loss control agents. The FLC-40 material includes very small particles of magnesium oxide (D50 is 1.0 micron; D90 is 5.5 microns, and specific surface area is about 160 $m^2/g$). The term "D50" refers to 50% of the particles being smaller than 1.0 microns; likewise D90 refers to 90% of the particles being smaller than 5.5 microns.

It is very hard to handle these small particles in field pumping. Additionally, the dust generated may be a problem. As noted, water is an unsuitable carrier for MgO, thus it was found that propylene glycol was discovered to be a suitable carrier fluid. Propylene glycol is miscible in the water which is the basis for aqueous VES-gelled fluids. The concentrated suspension of the MgO powder comprises at least 37 wt % MgO (5 lb/gal; 0.6 kg/liter), based on the combined weight of the propylene glycol and magnesium oxide, and may range up to about 51 wt % (9 lb/gal; 1.1 kg/liter).

The solid particulates and powders useful herein include, but are not necessarily limited to, slowly water-soluble alkaline earth metal oxides or alkaline earth metal hydroxides, transition metal oxides, transition metal hydroxides, or mixtures thereof. In one non-limiting embodiment, the alkaline earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the transition metals such as copper, tin, nickel, and the like may be used in relatively low concentration compared to or in combination with the alkaline earth metals. In one non-limiting embodiment, MgO may be obtained in high purity of at least 95 wt %, where the balance may be impurities such as Mg(OH)$_2$, CaO, Ca(OH)$_2$, SiO$_2$, Al$_2$O$_3$, and the like.

In one non-restrictive version, the loading of the carrier fluid may range up to about 37 wt %, alternatively up to about 41 wt %, and even as high as about 51 wt %. Alternatively, and independently, the lower end of the particle loading range may be about 5 wt %, in one non-limiting embodiment about 10 wt %, alternatively about 30 wt %.

In another non-limiting embodiment, the particle size of the additives and agents ranges between about 1 nanometer independently up to about 0.4 millimeter, alternatively up to 0.2 millimeter or even up to 0.1 millimeter. In another non-limiting embodiment, the particle size ranges between about 4 nanometers independently up to about 74 microns. It turns out that the particle size distribution of magnesium oxide is probably not a major factor for fluid loss control in VES-gelled fluids. In another non-restrictive version the fluid loss control agents may have a surface area of between about 10 to about 700 square meters per gram (m$^2$/g). In another non-restrictive version herein, the particles have an average particle size of about 400 microns in diameter or less, and alternatively about 200 microns in diameter or less.

Suitable non-aqueous carrier fluids for the slurries and suspensions herein include, but are not necessarily limited to alkylene glycols, glycerin, and mixtures thereof. In one non-limiting embodiment, alkylene glycols are defined herein as glycols with the structure HO(CH$_2$)$_x$OH where x ranges from 2 to 8, alternatively from 2 to 6, and in another non-limiting embodiment from 2 to 4 where the alkylene group may be straight or branched. More specifically, suitable glycols include, but are not necessarily limited to propylene glycol, ethylene glycol and the like. In one non-limiting embodiment, propylene glycol is preferred over ethylene glycol. Mono-propylene glycol degrades into lactic acid, which is more environmentally friendly as compared with ethylene glycol that degrades into oxalic acid.

The suspensions and slurries herein may be easily created by mixing the components. It is not expected or required than any suspension aids or other components or additives are necessary or helpful to maintain the suspension or slurry. However, it may be found that in some cases and under some conditions such suspension aids may be beneficial. At regular storage conditions, the shelf life of the slurries and suspensions herein may be about 12 months or longer.

The slurries or suspensions herein may be added along with the VES fluids prior to pumping downhole or other application. The VES-gelled aqueous fluids are prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid or other application, for a non-limiting example.

More specifically, and in non-limiting embodiments, the brines may be prepared using salts including, but not necessarily limited to, NaCl, KCl, CaCl$_2$, MgCl$_2$, NH$_4$Cl, CaBr$_2$, NaBr$_2$, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and CaCl$_2$ or NaCl, CaCl$_2$, and CaBr$_2$ as non-limiting examples.

The viscoelastic surfactants suitable useful herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN$^+$(R')$_2$O$^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEARFRAC™ fluid, which may also comprise greater than 10% of a glycol. This patent is incorporated herein in its entirety by reference. One useful VES is an amine oxide. As noted, a particularly preferred amine oxide is tallow amido propylamine oxide (TAPAO), sold by Baker Oil Tools as SURFRAQ™ VES fluid. SURFRAQ is a VES liquid product that is 50% TAPAO and 50% propylene glycol. These viscoelastic surfactants are capable of gelling aqueous solutions to form a gelled base fluid. The additives described herein may also be used in DIAMOND FRAQ™ fluid which is a VES system, similar to SURFRAQ fluid, which contains VES breakers sold by Baker Oil Tools.

The amount of VES included in the fracturing fluid depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the present methods and compositions is from about 1.0 to about 6.0% by volume VES product. In an alternate, non-restrictive embodiment, the amount of VES ranges from 2 to about 10 volume %.

In application, the concentrated slurry of MgO (or other particulate) may be diluted or mixed with the VES-gelled fluids at the surface before they are pumped downhole. The temperature range for the concentrated slurry itself may be from about −30 to about 150° F. (about −34 to about 66° C.) as storage and field temperatures. When the slurry is mixed with the VES-gelled fluids, the application or use temperature may range from about 70 to about 400° F. (about 21 to about 204° C.), alternatively up to about 300° F. (about 149° C.).

In hydraulic fracturing applications, propping agents are typically added to the base fluid after the addition of the VES. Propping agents include, but are not limited to, for instance, quartz sand grains, glass and ceramic beads, sized calcium carbonate and other sized salts, bauxite grains (e.g. sintered bauxite), walnut shell fragments, aluminum pellets, nylon pellets, and the like solid particulate matter suitable as a screen or proppant. The propping agents are normally used in concentrations between about 1 to 14 pounds per gallon (120-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In the methods and compositions herein, the base fluid can also contain additives which can contribute to breaking the gel (reducing the viscosity) of the VES fluid.

While the viscoelastic fluids are herein described most typically herein as having use in fracturing fluids, it is expected that they will find utility in completion fluids, gravel pack fluids, fluid loss pills, lost circulation pills, diverter fluids, foamed fluids, stimulation fluids, water and/or gas control fluids, enhanced oil recovery (i.e. tertiary recovery) fluids, and the like.

In another non-restrictive embodiment, the treatment fluid may contain other viscosifying agents, other different surfactants, clay stabilization additives, scale dissolvers, biopolymer degradation additives, and other common and/or optional components.

In a more preferable embodiment herein, use with internal VES breakers can have synergistic clean-up effects for the fluid loss control agent and the VES fluid. Use of the compositions herein with an internal breaker may allow less VES fluid to leak-off into the reservoir, thus resulting in less fluid needing to be broken and removed once the treatment is over. Additionally, use of an internal breaker within the VES micelles may further enhance the breaking and removal of the pseudo-filter cake viscous VES layer that develops on the formation face with the fluid loss agents herein. Lab tests to date appear to show that the viscous VES pseudo-filter cake has the micelles readily broken down to the relatively non-viscous, more spherically-shaped micelles by use of an internal breaker, and also with use of an encapsulated breaker, if used.

The invention will be further described with respect to the following Examples which are not meant to limit the invention, but rather to further illustrate the various embodiments.

EXAMPLES 1-4

Lab tests compare the slurry and original magnesium oxide powder in viscosity maintenance and fluid loss control efficiency of VES fluids at 250° F. (121° C.). FIG. 1 presents a graph of leakoff as a function of time for tests with 400 md ceramic discs at 250° F. (121° C.) and 300 psi (2.1 MPa) for different fluid loss control agents, where the base fluid was 13.0 ppg (1.6 kg/liter) brine ($CaCl_2/CaBr_2$), 4% VES, and 1 gptg GBW-407L breaker available from Baker Oil Tools (SI units of gallons per thousand gallons have the same value for any convenient SI unit; e.g. liters per thousand liters or m$^3$/1000 m$^3$, etc.). The base fluid is the same for all Examples. The tests used 16 pptg (1.9 kg/m$^3$) of FLC-40 MgO introduced as powder (Example 1) compared with 4 gptg (4 liter/1000 liters) of FLC-40L MgO introduced as a powder slurry in propylene glycol (about the same amount of active MgO) (Example 2). The MgO loading in FLC-40L is 37 wt % (5 lb/gal; 0.6 kg/liter). As may be seen, the concentrated suspension of Example 2 had better performance than the original magnesium oxide powder (Example 1), that is, the fluid did not leak off as fast over the same period of time.

FIG. 2 presents a graph of viscosity as a function of time for VES-gelled aqueous fluids at 250° F. (121° C.) and 100 s$^{-1}$ with the base fluid for 16 pptg (1.9 kg/m$^3$) of FLC-40 (Example 1) compared with 4 gptg (0.5 gram/liter) of FLC-40L (Example 2). It may be seen that after the initial period, the fluid with the inventive slurry (Example 2) had better viscosity stability over time than the fluid where the MgO was added directly as a powder (Example 1).

FIG. 3 is a graph of viscosity as a function of time for VES-gelled aqueous fluids at 250° F. (121° C.) and 100 s$^{-1}$ with the base fluid for 16 pptg (0.5 g/liter) of FLC-40 (Example 1) compared with 4 gptg (4 liter/1000 liters) of FLC-40L (Example 2), as well as 6 pptg (0.7 g/liter) VES STA-1 (Example 3) and 6 pptg (0.7 g/liter) VES STA-1 with 10 pptg (1.2 kg/m$^3$) FLC-40 (Example 4). VES-STA 1 is Baker Oil Tools' proprietary VES-gelled fluids stabilizer. This stabilizer is not a glycol or polyol. The particles of VES-STA1 have a mean particle size of 5 microns. These materials have roughly the same viscosity profile after about 20 minutes, although as noted for FIG. 2, the viscosity for the fluid of Example 2 is more stable than that of Example 1.

FIG. 4 is a graph of viscosity as a function of time for VES-gelled aqueous fluids at 250° F. (121° C.) and 100 s$^{-1}$ with the base fluid for 6 pptg (0.7 g/liter) VES STA-1 (Example 3) and 6 pptg (0.7 g/liter) VES STA-1 with 10 pptg (1.2 kg/m$^3$) FLC-40 (Example 4) compared to the same base fluid with 4 gptg (4 liter/1000 liters) of FLC-40L (Example 2). That is, the curve for Example 1 has been removed from FIG. 3 to give FIG. 4. It may be seen that the viscosity stability of the fluid of inventive Example 2 is comparable to the other two Examples.

In the foregoing specification, the invention has been described with reference to specific embodiments thereof, and has been demonstrated as effective in improving the handling of certain particulates and powders, such as the delivery of particulate fluid loss agents to viscoelastic surfactant-gelled fluids. The introduction of the particulates in the form of a slurry avoids the dust problems of prior products.

However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of alkaline earth metal oxides and alkaline earth metal hydroxides, transition metal oxides and transition metal hydroxides, non-aqueous carrier fluids, brines, viscoelastic surfactants, and other components falling within the claimed parameters, but not specifically identified or tried in a particular composition, are anticipated to be within the scope of this invention. In another non-limiting embodiment, the compositions and methods herein may find utility in delivering MgO and similar materials in the fields of livestock feeding, fertilizer handling and pharmaceuticals.

As used herein in the claims the term "comprising" is to be interpreted to mean "including but not limited to".

What is claimed is:

1. A method for treating a subterranean formation with an aqueous viscoelastic treating fluid comprising an aqueous base fluid and a viscoelastic surfactant (VES) gelling agent, the method comprising:
    adding to the aqueous viscoelastic treating fluid a fluid loss control agent slurry comprising a non-aqueous fluid selected from the group consisting of alkaline glycols, glycerin and mixtures thereof, and a fluid loss control agent selected from the group consisting of alkaline earth metal oxides, alkaline earth metal hydroxides, transition metal oxides, transition metal hydroxides, and mixtures thereof;
    injecting the aqueous viscoelastic treating fluid through a wellbore and into the subterranean formation; and
    treating the subterranean formation.

2. The method of claim 1 where in the fluid loss control agent, the alkaline earth metal is selected from the group consisting of magnesium, calcium, strontium, barium and mixtures thereof.

3. The method of claim 1 where the fluid loss control agent is magnesium oxide particles having an average particle size of about 400 microns or less.

4. The method of claim 1 where the non-aqueous fluid is propylene glycol.

5. The method of claim 1 where the wt % of particles in the non-aqueous fluid ranges from about 5 to about 51 wt %.

6. The method of claim 1 where the aqueous base fluid is brine.

7. The method of claim 1 where the amount of the fluid loss control agent ranges from about 2 to about 200 pptg (about 0.2 to about 24 kg/m$^3$) based on aqueous viscoelastic treating fluid.

8. The method of claim 1 where treating the subterranean formation is selected from the group consisting of:
    fracturing the formation under effective pressure where the aqueous viscoelastic treating fluid further comprises a proppant;
    packing the formation with gravel where the aqueous viscoelastic treating fluid further comprises gravel;
    stimulating the formation where the aqueous viscoelastic treating fluid further comprises a stimulating agent;
    completing a well; and
    controlling fluid loss where the aqueous viscoelastic treating fluid further comprises a salt or easily removed solid; and
    combinations thereof.

9. The method of claim 1 where for a period of time during the method the fluid is at a temperature of from about 70° F. to about 400° F. (about 21 to about 204° C.).

10. A method for treating a subterranean formation with an aqueous viscoelastic treating fluid comprising a brine base fluid and a viscoelastic surfactant (VES) gelling agent, the method comprising:
    adding to the aqueous viscoelastic treating fluid a fluid loss control agent slurry comprising a non-aqueous fluid selected from the group consisting of alkaline glycols, glycerin and mixtures thereof, and a fluid loss control agent selected from the group consisting of alkaline earth metal oxides, alkaline earth metal hydroxides, transition metal oxides, transition metal hydroxides, and mixtures thereof, where the fluid loss control agent has an average particle size of about 400 microns or less;
    injecting the aqueous viscoelastic treating fluid through a wellbore and into the subterranean formation; and
    treating the subterranean formation.

11. The method of claim 10 where in the fluid loss control agent, the alkaline earth metal is selected from the group consisting of magnesium, calcium, strontium, barium and mixtures thereof.

12. The method of claim 10 where the non-aqueous fluid is propylene glycol.

13. The method of claim 10 where the wt % of particles in the non-aqueous fluid ranges from about 5 to about 51 wt %.

14. The method of claim 10 where the amount of the fluid loss control agent ranges from about 2 to about 200 pptg (about 0.2 to about 24 kg/m$^3$) based on aqueous viscoelastic treating fluid.

* * * * *